United States Patent
Zhuang et al.

(10) Patent No.: US 7,487,187 B2
(45) Date of Patent: Feb. 3, 2009

(54) METHOD AND APPARATUS FOR TWO STAGE TRANSACTION HANDLING

(75) Inventors: Hai Zhuang, Issaquah, WA (US); Srinivasan Parthasarrathy, Redmond, WA (US); Hans Jorgen Gron, Kirkland, WA (US); Lars Mikkelsen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 11/038,805

(22) Filed: Jan. 20, 2005

(65) Prior Publication Data

US 2006/0161509 A1    Jul. 20, 2006

(51) Int. Cl.
*G06F 17/30* (2006.01)
(52) U.S. Cl. .............................. 707/201; 707/8; 707/10; 707/200
(58) Field of Classification Search .................. 707/8, 707/10, 200–206
See application file for complete search history.

(56) References Cited

U.S. PATENT DOCUMENTS

| | | | | |
|---|---|---|---|---|
| 5,835,757 A * | 11/1998 | Oulid-Aissa et al. | ........... | 707/10 |
| 6,115,715 A * | 9/2000 | Traversat et al. | ............ | 707/100 |
| 6,718,349 B2 * | 4/2004 | Weedon | ...................... | 707/201 |
| 7,003,587 B1 * | 2/2006 | Battat et al. | ................. | 709/227 |
| 7,146,366 B2 * | 12/2006 | Hinshaw et al. | ................ | 707/8 |

* cited by examiner

*Primary Examiner*—Cam-Linh Nguyen
(74) *Attorney, Agent, or Firm*—Marshall, Herstain & Borun LLP

(57) ABSTRACT

A data transaction system allows performing a transaction related to a data unit, where the data unit can be independently saved and retrieved, from an upper layer to a storage layer without causing a database deadlock related to the data unit in the storage layer. The data transaction system uses a first stage for transferring the data unit from the upper layer to the storage layer, and a second stage to save the transferred data unit independent of the upper layer. The data transaction system guarantees data consistency in applications using multiple layer architecture and at the same time avoiding cost and inefficiencies related to a database deadlock scenario.

20 Claims, 4 Drawing Sheets

METHOD AND APPARATUS FOR TWO STAGE TRANSACTION HANDLING

TECHNICAL FIELD

This patent relates generally to computer software and more particularly to business application software using the Internet.

BACKGROUND

Computers and computer software make a very important part of modern life and business. Specifically, for any business organization to stay competitive, it is imperative that it uses various computer based software to manage data, customers, employees, etc. Businesses use a number of different software for virtually every function of their daily operations, including payroll, customer relation management, accounting, inventory management, etc. Each of these various software generally use one or more underlying database to store data and a number of graphical user interface (GUI) based forms to interact with the computer user. Depending on the business model, there may also be one or more intermediate layers operating between such database and the forms presented to the end user. This is especially true in the case of software using the Internet or other similar platform to provide applications.

For example, various accounting systems, customer relation management systems, human resource management systems, etc., operate as multilayer applications that run in network environment, allowing multiple users to access the system from multiple locations. These applications use a storage layer or a data layer to store data that may be accessed by the various locations over the network. For example, a database server or a collection of database servers may be used to store data used by such an application. Each of the various locations use an upper layer, such as a presentation layer or an interaction layer, to present the data from users or other application, to interact with users and other applications to receive, provide and change data, etc.

An example of such an upper layer may be an Internet browser, a spreadsheet application, an active server pages (ASP) application, etc., where such an upper layer may query data for one or more users, receive data from one or more users, and communicate data to the storage layer for storage. Quite often it is possible that one or more of the multiple users may need to transfer data to the storage layer at nearly the same time. In such a situation, it is imperative that the consistency of data passed to the storage layer is guaranteed. For example, for an accounting system using such multiple layer architecture, one user of the upper layer may be posting a transaction involving a bank account, while at the same time, another user may be querying the storage layer to get information related to the same bank account. Such an attempt by multiple users to access the bank account form the storage layer may cause a database deadlock, either denying access to both users, or in a worse case, communicating erroneous information to one or more of such multiple users. Therefore, these is a need to ensure that users interacting with multiple layer applications via an upper layer are able to initiate and commit transactions between such upper layer and the storage layer without causing database deadlock.

SUMMARY

A data transaction system allows performing a transaction related to a data unit, where the data unit can be independently saved and retrieved, from an upper layer to a storage layer without causing a database deadlock related to the data unit in the storage layer. The data transaction system uses a first stage for transferring the data unit from the upper layer to the storage layer, and a second stage to save the transferred data unit independent of the upper layer. The data transaction system guarantees data consistency in applications using multiple layer architecture and at the same time avoiding cost and inefficiencies related to a database deadlock scenario.

BRIEF DESCRIPTION OF DRAWINGS

The present patent is illustrated by way of examples and not limitations in the accompanying figures, in which like references indicate similar elements, and in which.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Network

Figure 1:
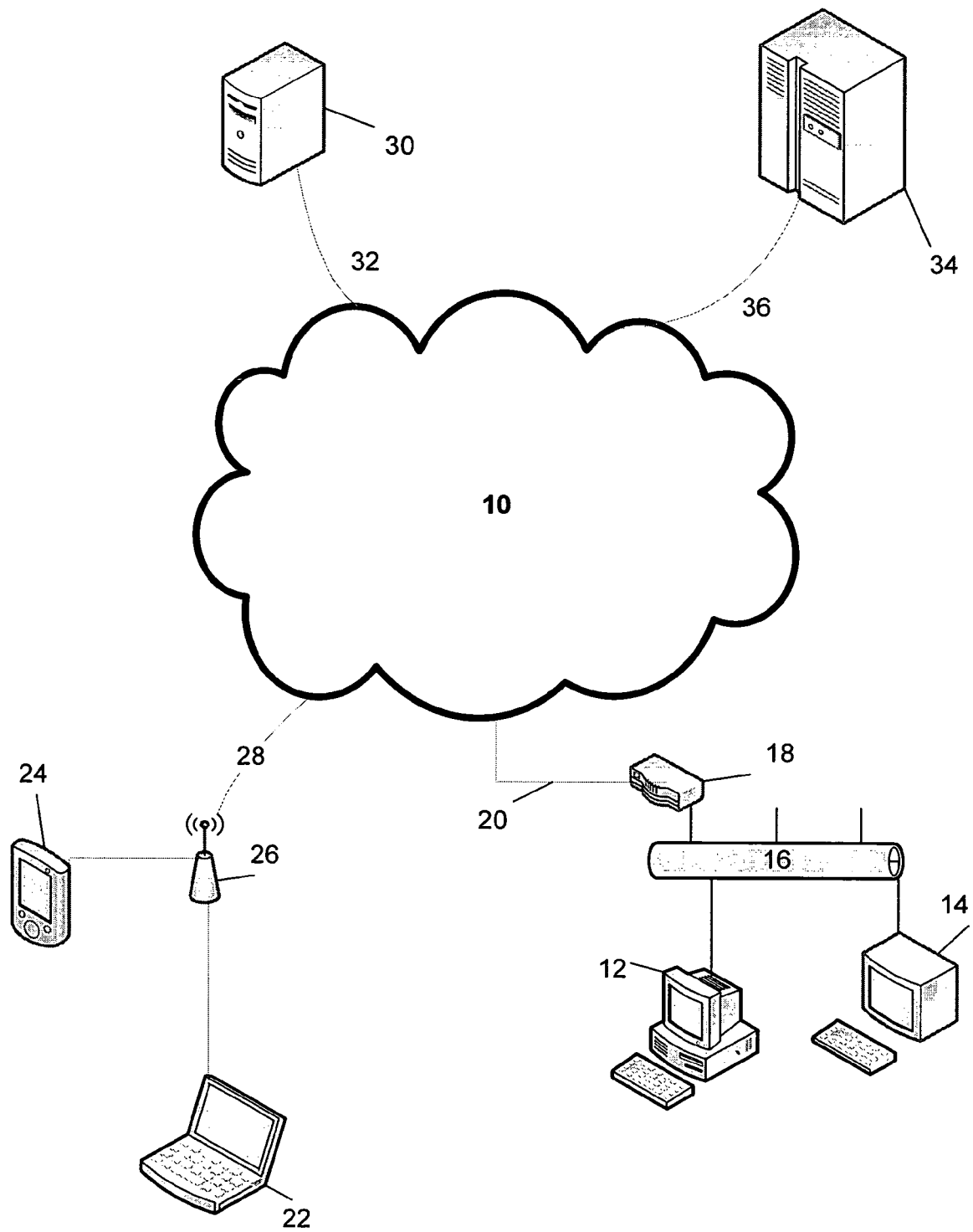
FIG. 1 is a block diagram of a network interconnecting a plurality of computing resources.

FIG. 1 illustrates a network 10 that may be used to implement an XML versioning system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

Computer

Figure 2:
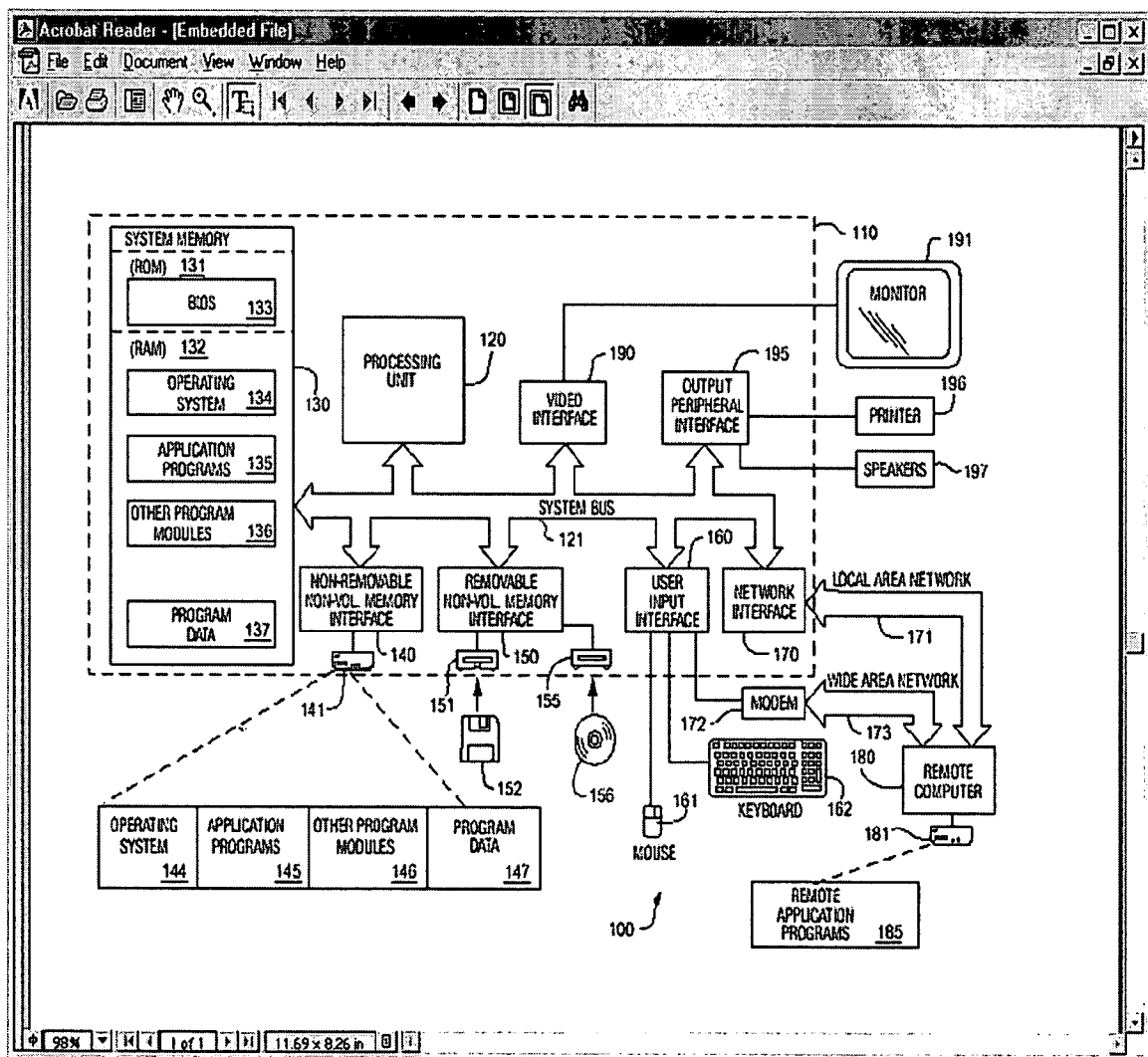
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Two-Stage Transaction Handling System

Figure 3:
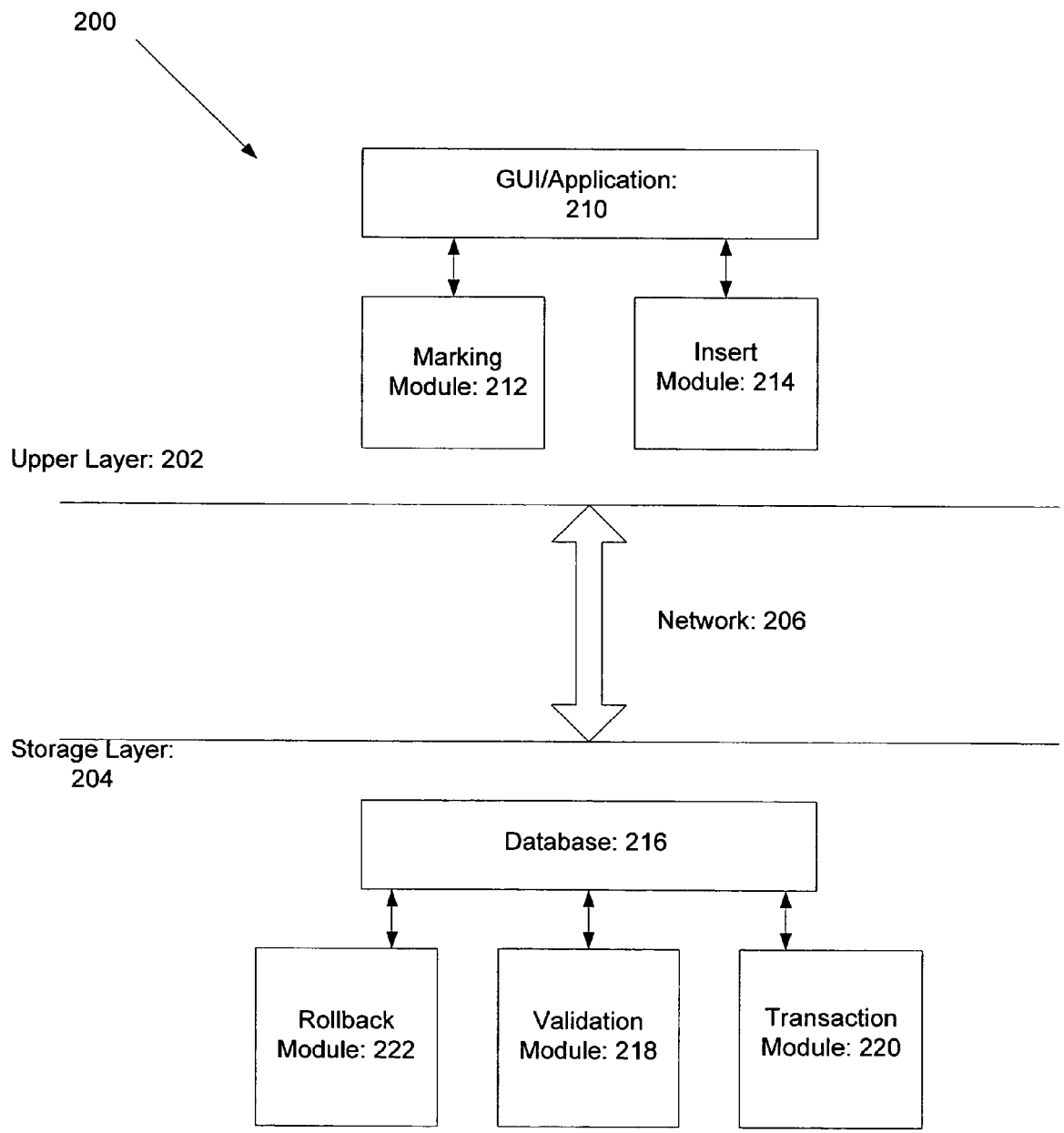
FIG. 3 illustrates a block diagram of a two-stage transaction handling system.

FIG. 3 illustrates a block diagram of a two-stage transaction handling system 200 that may be used to process a data transaction between an upper layer and a storage layer. The system 200 is illustrated as operating between an upper layer 202 and a storage layer 204. The upper layer 202 and the storage layer 204 are communicatively connected with each other via a network 206 such as the network 10, the Internet, etc. The upper layer may be any of the commercially used application layers, such as for example, the .Net® layer provided by the Microsoft corporation, whereas the storage layer 204 may be implemented using a database server.

The upper layer 202 may include an application 210 that may interact with a user via a graphical user interface (GUI) or with other applications running on the upper layer. The application 210 may receive data and/or requests from a user to retrieve data related to a data unit, to update data related to a data unit, etc., where such data unit may be stored on the storage layer 204.

The data unit may be a master data unit that may represent a master data record that may be saved and retrieved independently, and that may have an independent function associated with it. An example of a master data unit for an accounting application may be a customer account record. Such a master data unit may have one or more child data associated with it. For example, the billing address of a customer is child data associated with the customer account record master data. Another example of master data unit for an accounting application is a sales invoice record, which may have a number of sales line items, each of which is a child data unit.

The system 200 may include a marking module 212 and an insert module 214 to handle such request from the application 210 to query, change, update, etc., operations to be performed on the data unit. Specifically the marking module may be used to mark a particular data unit before a specific operation on that specific data unit is transferred to the storage layer 204 as well as to mark that specific data unit after an acknowledgement is received from the storage layer.

The insert module 214 may include various procedures, such as a procedure to set various read only properties of the data unit based on current information received from the system 200, the properties including a CreatedBy property, a UpdateBy property, etc. The functioning of the marking module 212 and the insert module 214 are further described below in FIG. 4. One of ordinary skill in the art would understand that each of the various modules 214, 216, etc., may be implemented by software, hardware, firmware or as any combination thereof.

While in the system 200, the upper layer 202 is illustrated to have only the modules 212 and 214 communicating with the application 210, in an alternate implementation, other modules may also be used. For example, in am implementation, the upper layer 202 may also have a concurrency check module that is used to perform a concurrency check such as an optimistic concurrency check or a pessimistic concurrency check to guard from multiple users or applications accessing the same data unit record at the same time.

The storage layer 204 may include a database 216 having a plurality of data tables. The database 216 may be implemented using a database server having an SQL® database or any other database well-known to those of ordinary skill in the art. The database 216 may include a table for storing values related to various instances of the data unit. Thus the database 216 may have tables for each of the various child data related to a master data unit such as a customer account, etc. Normally, a number of applications may request values from these tables via a query or may request to set the values in this table by initiating data transactions with the database 216.

In the two-stage transaction system 200 illustrated in FIG. 3, the storage layer may also include a validation module 218, a transaction module 220 and a rollback module 222 that may interact with the database 216. The validation module 218 may be used to perform a validation of input data to a table related to the data unit, to confirm that the input data is valid according to one or more business rules that may be stored in the validation module 218. For example, if the input data to a customer account data unit includes a customer age of five years and if the validation module 218 includes a business rule that requires minimum customer age to be fifteen years, the validation module 218 may determine that the input data to the customer account table is invalid.

The transaction module 220 may be used to perform a data transaction with the database 216. For example, the transaction module 218 may include various routines for updating a value in a table from the database 216, where such a table is related to the data unit, etc. The rollback module 222 may be used to roll back a transaction performed on a table related to the data unit within the database 216. The rollback module 222 may include a clean-up routine that may be used to clean up data input to a table in the database 216, if necessary. One of ordinary skill in the art would understand that each of the various modules 218, 220, 222, etc., may be implemented as software, as hardware or as any combination thereof.

Figure 4:
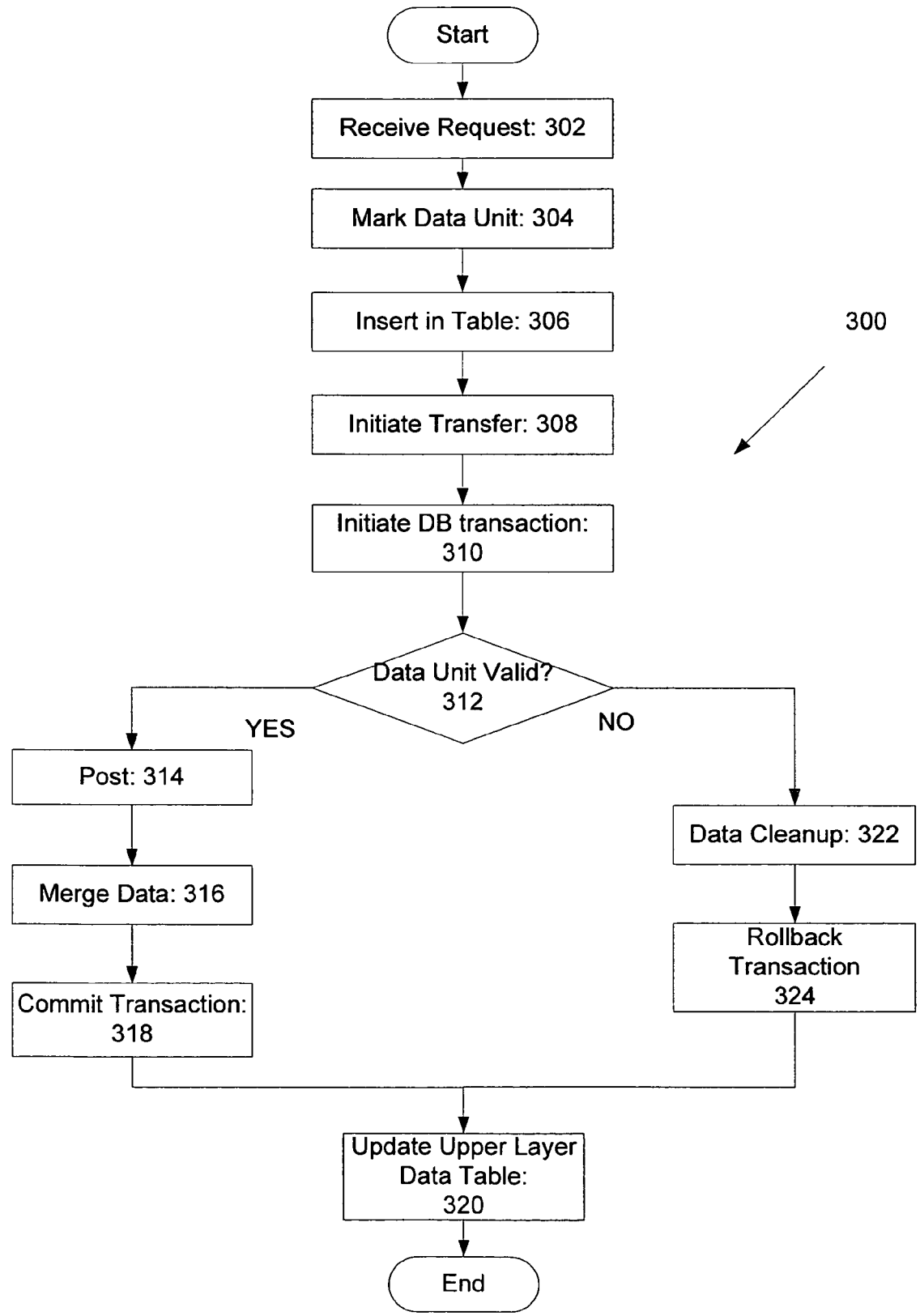
FIG. 4 illustrates a flowchart of a two-stage transaction handling program that may be used by the system of FIG. 3.

Now referring to FIG. 4, a flowchart illustrates a two-stage transaction handling program 300 that may be used by the data transaction system 200. The program 300 may be implemented on a distributed platform where various functions, denoted by the blocks of the flowchart in FIG. 4, are performed at different locations on a network, such as the network 10. Moreover, various modules 212-222 of the data transaction system 200 may be used to perform different functions of the program 300. It is possible that the program 300 is implemented by software, firmware, and hardware or by any combination thereof. For example, one of the function of the program 300 that is performed by the insert module 214 may be implemented in software while another function of the program 300 that is performed by the validation module 218 may be implemented in hardware, etc.

At a block 302 the system 200 receives a request in the upper layer 202 for a data transaction related to a data unit that is stored on the database 216. Such request may be received from a client using a graphical user interface that provides access to data stored in the database 216, or in any other related manner. An example of a request received by the program 200 supporting a distributed accounting system may be a request to update a sales invoice record.

Upon receiving such a request, at a block 304, the marking module 212 marks up the sales invoice record in an upper layer data table. Specifically, the marking module 212 may mark up the sales invoice record as invalid. The sales invoice record may be a master data unit that can be saved and retrieved independently and it may have one or more business functions associated with it. Moreover, the sales invoice record may also have a plurality of child data associated with it, such as various lines of a sales invoice. The marking module may mark up only the sales invoice data unit as it may not be necessary to mark up the child data.

Subsequently at a block 306, the insert module 214 inserts data into the upper layer data table related to the sales invoice record. For example, if a user has requested to set a sales tax field in the sales invoice record to be of first value, the insert module 214 will set the sales tax value in the upper layer data table related to the sales invoice record to be equal to first value. The user may insert various information related to other lines of the sales invoice record as well, in which case the insert module would insert various values as provided by the user into the upper layer table related to the sales invoice record.

After inserting various value, at a block 308, the insert module 214 may initiate various post save procedures attached to the sales invoice record. Subsequently, at the block 310, the data system 200 also initiates a database transaction by transferring the updated sales invoice record to the database 216.

Once the storage layer 204 receives information regarding the initiation of the database transaction related to the sales invoice record, at a block 310, the system 200 initiates a database transaction.

At a block 312, the validation module 218 may perform a validation of input data to a table in the database 216 related to the sales invoice record. The validation module 218 may confirm that the input data is valid according to one or more business rules related to the sales invoice record. Such rules may be stored in the validation module 218.

If the validation module 218 determines that the input data to be input to the table in the database 216 related to the sales invoice is valid, at a block 314, the transaction module 220 may post the sales invoice. If it is necessary to merge some data related to the sales invoice record with any other database records, at a block 316, the transaction module 220 may perform such merging operation. Once the various database tables related to the sales invoice record has been updated and merged, at a block 318, the transaction module 220 commits the transaction of updating the sales invoice record.

If at the block 312, the validation module 218 determines that the input data to be input to the table in the database 216 related to the sales invoice is not valid, at a block 322 the rollback module 222 may perform any data clean up necessary to bring the database table related to the sales invoice record back to the state it was before the database transaction was initiated at the block 310. At a block 322, the rollback module 222 may also roll back the database transaction performed at the block 310.

Finally, at a block 320, the marking module 212 updates the status of the upper layer data table related to the sales invoice record. The marking module 212 may receive a communication from the storage layer as to whether the database transaction was committed at the block 318 or whether it was rolled back at the block 324. If the database transaction was committed at the block 318, the marking module may change to the status of the upper layer data table related to the sales invoice record from invalid to valid. On the other hand, if the database transaction was rolled back at the block 324, the marking module may restore the data of the upper layer data table related to the sales invoice record to its value prior to the insert operation performed at the block 306.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of performing a data transaction between an upper layer and a storage layer, the method comprising:
    creating a data unit at a client side upper layer and a data unit at a server side storage layer, wherein the server is separate and distinct from the client and wherein the client side data unit includes corresponding parameters and values to the server side data unit;
    receiving a request at a client side upper layer application to modify the server side data unit and in response to the request;
    marking the client data unit in the upper layer as invalid when preparing to update the server side data unit at the storage layer;
    inserting update data into the client side data unit at the upper layer;
    transferring the update data to the storage layer without executing a database transaction at the storage layer;
    executing a database transaction from within the storage layer after the update data is transferred from the upper layer, wherein the database transaction is executed at the storage layer independently of upper layer application, the data base transaction comprising:
    validating the update data at the storage layer;
    performing a store transaction at the storage layer if the update data is validated;
    performing a rollback transaction at the storage layer if the update data is not validated;
    transmitting an indication from the storage layer to the upper layer that the database transaction is successful; and
    marking the client data unit at the upper layer from invalid to valid if the store transaction is successful.

2. A method of claim 1, wherein:
    (a) marking the data unit as invalid and inserting the data unit into the storage layer are undertaken at the upper layer; and
    (b) validating the data unit, performing the store transaction and performing the rollback transaction are undertaken at the storage layer.

3. A method of claim 2, further comprising using at least one of: (1) an optimistic concurrency check and (2) a pessimistic concurrency check at the upper layer.

4. A method of claim 1, further comprising:
    comparing the original value of the data unit with a value of the update data; and
    linking the original value of the data unit to the update data before transferring the update data to the storage layer if transferring the update data to the storage layer results in updating a value of the data unit.

5. A method of claim 1, wherein the data unit is a master data unit.

6. A method of claim 1, wherein performing the rollback transaction further includes performing data clean up.

7. A method of claim 1, wherein performing the store transaction further comprises data merging.

8. A method of claim 1, further comprising:
using metadata to describe the data unit at the upper layer; and
using the metadata description of the data unit to update the data unit at the storage layer.

9. A method of claim 1, further comprising updating the status of the data unit at the upper layer after performing the store transaction at the storage layer.

10. A computer storage medium having modules of computer-executable instructions for performing a data transaction between an upper layer and a storage layer comprising:
a data unit at a client side upper layer and a data unit at a server side storage layer, wherein the server is separate and distinct from the client and wherein the client side data unit includes corresponding parameters and values to the server side data unit;
a marking module adapted to mark the client data unit in the upper layer as invalid when preparing to update the server side data unit;
an insert module adapted to insert update data into the client side data unit at the upper layer;
a transfer module adapted to transfer the update data transaction to the storage layer from the client without executing a database transaction at the storage layer;
a client side upper layer application adapted to receive a request to modify the server side data unit and in response to the request executing the marking module, the insert module, and the transfer module;
a validation unit at the storage layer adapted to validate at the storage layer an input data related to the data unit;
a transaction module at the storage layer to perform a store transaction at the storage layer to store the data input into a database, wherein the marking module is further adapted to mark the data unit at the upper layer from invalid to valid if the data unit is successfully stored into the database;
a rollback module at the storage layer adapted to perform a rollback transaction if the data unit is not validated; and
a module adapted to execute a database transaction from within the storage layer after the update data is transferred from the upper layer, wherein the database transaction is executed at the storage layer independently of the upper layer application, the data base transaction comprising executing the validation unit, the transaction module, and the rollback module, if the data unit is not validated.

11. The computer storage medium of claim 10, wherein the transaction module performs the store transaction only if the input data related to the data unit is validated by the validation unit.

12. The computer storage medium of claim 10, further comprising a concurrency check module adapted to perform at least on of: (1) an optimistic concurrency check and (2) a pessimistic concurrency check on the data unit.

13. The computer storage medium of claim 10, further comprising:
a comparison module adapted to compare the original value of the data unit with a value of the update data; and
a linking module adapted to link the original value of the data unit to the update data before transferring the update data to the storage layer if transferring the update data to the storage layer results in updating a value of the data unit.

14. The computer storage medium of claim 10, wherein the data unit is a master data unit.

15. The computer storage medium of claim 10, wherein the roll back module is further adapted to perform data clean up.

16. The computer storage medium of claim 10, wherein the transaction module is further adapted to perform a merging operation to merge the data unit to a plurality of data tables in the database.

17. The computer storage medium of claim 10, further comprising a communication unit in the storage layer adapted to communicate to the upper layer whether the data unit is validated or not.

18. A data transaction system for performing a data transaction related to a data unit, the system comprising:
a client computing device representing an upper layer, the client computing device having a client device memory for storing modules of executable instructions including:
a first data unit of the client having a corresponding server side data unit, wherein the client data unit includes corresponding parameters and values to the server side data unit;
a receiver module adapted to receive a transaction related to the first data unit and the corresponding server side data unit,
a marking module adapted to mark the first data unit as invalid,
an insert module adapted to insert an update data into the first data unit,
a transfer module adapted to transfer the update data to a storage layer from the client without executing a database transaction at the storage layer; and
a server computing device representing the storage layer, the server computing device having a server device memory for storing modules of executable instructions and the server side data unit including:
a validation module adapted to validate the update data related to the data unit,
a transaction module to perform a store transaction to store the update data into a database associated with the server computing device,
a rollback module adapted to perform a rollback transaction if the data unit is not validated, and
a module adapted to execute a database transaction from within the storage layer after the update data is transferred from the upper layer, wherein the database transaction is executed at the storage layer independently of the upper layer application, the data base transaction comprising executing the validation module, the transaction module, and the rollback module, if the data unit is not validated,
wherein the marking module is further adapted to mark the data unit at the upper layer from invalid to valid if the data unit is successfully stored into the database.

19. A system of claim 10, wherein the transaction module performs the store transaction only if the input data related to the data module is validated by the validation module.

20. A system of claim 10, further comprising a concurrency check module located in the upper layer and adapted to perform at least on of: (1) an optimistic concurrency check and (2) a pessimistic concurrency check on the data module.

* * * * *